US007738911B2

(12) United States Patent
Kim (10) Patent No.: US 7,738,911 B2
(45) Date of Patent: Jun. 15, 2010

(54) APPARATUS AND METHOD FOR USING A ROTATING KEY ON A MOBILE TERMINAL

(75) Inventor: Dong-Ryong Kim, Gumi-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 1204 days.

(21) Appl. No.: 10/823,603

(22) Filed: Apr. 14, 2004

(65) Prior Publication Data

US 2004/0209642 A1 Oct. 21, 2004

(30) Foreign Application Priority Data

Apr. 15, 2003 (KR) ...................... 10-2003-0023723

(51) Int. Cl.
*H04M 1/00* (2006.01)
(52) U.S. Cl. ................. 455/550.1; 455/575.1; 455/566; 455/3.06; 348/838
(58) Field of Classification Search .............. 455/550.1, 455/575.1, 556.1, 566, 3.06, 3.04, 425, 3.02; 348/211, 552, 14.01, 14.07, 838; 200/344, 200/4, 6, 5 R
See application file for complete search history.

(56) References Cited

U.S. PATENT DOCUMENTS

| 6,441,753 | B1 * | 8/2002 | Montgomery ................. 341/34 |
| 6,771,992 | B1 * | 8/2004 | Tomura et al. ........... 455/575.1 |
| 6,775,361 | B1 * | 8/2004 | Arai et al. ................ 379/93.17 |
| 6,941,154 | B1 * | 9/2005 | Ritter ....................... 455/550.1 |
| 2002/0101515 | A1 * | 8/2002 | Yoshida et al. .............. 348/211 |
| 2004/0056985 | A1 * | 3/2004 | Seong ......................... 348/838 |
| 2004/0118670 | A1 * | 6/2004 | Park et al. .................... 200/344 |
| 2004/0127267 | A1 * | 7/2004 | Wong et al. .............. 455/575.1 |
| 2004/0214612 | A1 * | 10/2004 | Park et al. .................... 455/566 |
| 2004/0218738 | A1 * | 11/2004 | Arai et al. ................ 379/93.17 |
| 2005/0168566 | A1 * | 8/2005 | Tada et al. ............... 348/14.01 |
| 2007/0099656 | A1 * | 5/2007 | Yoo et al. ................ 455/556.1 |

FOREIGN PATENT DOCUMENTS

| CN | 1246230 A | 3/2000 |
| JP | 2000115597 | 4/2000 |
| JP | 2001-296953 | 10/2001 |
| JP | 2002-229732 | 8/2002 |
| JP | 2003-015809 | 1/2003 |
| KR | 1020020065059 A | 8/2002 |
| WO | WO 9929087 | 6/1999 |

* cited by examiner

*Primary Examiner*—Tan Trinh
(74) *Attorney, Agent, or Firm*—Roylance, Abrams, Berdo & Goodman, LLP (57) ABSTRACT

An apparatus and method is provided for a mobile terminal with a rotating key having a plurality of dome switches on one side which can detect a contact signal when pressed and a plurality of contact surfaces on the other side which can detect the position of the rotating key in each direction of rotation. The apparatus and method for using the rotating key comprise the steps of detecting if the rotating key is turned or a dome switch is pressed in a menu selection mode; when the rotating key is turned, selecting a menu according to the direction of rotation; and when a dome switch is pressed, selecting a menu according to the pressed dome switch.

27 Claims, 9 Drawing Sheets

APPARATUS AND METHOD FOR USING A ROTATING KEY ON A MOBILE TERMINAL

PRIORITY

This application claims priority under 35 U.S.C. §119(a) to an application entitled "Method for Using Rotating Key on Mobile Terminal" filed in the Korean Intellectual Property Office on Apr. 15, 2003 and assigned Serial No. 2003-23723, the entire contents of which are incorporated herein by reference.

BACKGROUND OF THE INVENTION

1. Field of the Invention

The present invention relates to an apparatus and method for using a rotating key provided on a mobile terminal. More particularly, the present invention relates to an apparatus and method for rapidly selecting a menu and an operation mode function using a rotating key provided on a mobile terminal.

2. Description of the Related Art

A mobile terminal has a keypad with a plurality of keys used for inputting data, which typically include a send (SND) key, a cancel key, a clear (CLR) key, number/character keys, an end (END) key, function keys and a power (PWR) key. 15 to 20 keys are normally provided on the front side of a main housing of the mobile terminal to enable a user to input or select desired data by the pressing of keys.

However, it is not easy for the user to find and press the proper keys to select and implement an operation mode function from a variety of menus. Also, the user has to rapidly move his or her fingers onto the keys to be pressed when trying to rapidly change functions of the mobile terminal. Since it is difficult to rapidly select an operation mode function from a variety of menus, fast mobile Internet access cannot be achieved.

SUMMARY OF THE INVENTION

Accordingly, the present invention has been made to solve the above-mentioned problems occurring in the prior art, and an object of the present invention is to provide an apparatus and method for rapidly selecting a menu and an operation mode function using a rotating key provided on a mobile terminal.

In accordance with one aspect of the present invention for accomplishing the above object, an apparatus and method for using a rotating key on a mobile terminal is provided. The rotating key has a plurality of dome switches on one side which can detect a contact signal when pressed by a user and a plurality of contact surfaces on the other side which can detect the position of the rotating key in each direction of rotation. The apparatus and method comprises detecting if the rotating key is turned or a dome switch is pressed in a menu selection mode; when the rotating key is turned, selecting a menu according to the direction of rotation; and when a dome switch is pressed, selecting a menu according to the pressed dome switch.

In accordance with another aspect of the present invention, an apparatus and method for using a rotating key on a mobile terminal with a built-in camera is provided. The rotating key has a plurality of dome switches on one side which can detect a contact signal when pressed by a user and a plurality of contact surfaces on the other side which can detect the position of the rotating key in each direction of rotation. The apparatus and method comprises when a zoom function is selected in a camera mode, zooming in or out according to the direction and speed of rotation of the rotating key; and when a brightness control function is selected in the camera mode, controlling the brightness of a picture according to the direction and speed of rotation of the rotating key.

In accordance with still another aspect of the present invention, an apparatus and method for using a rotating key on a mobile terminal is provided. The rotating key has a plurality of dome switches on one side which can detect a contact signal when pressed by a user and a plurality of contact surfaces on the other side which can detect the position of the rotating key in each direction of rotation. The apparatus and method comprises detecting the direction and speed of rotation of the rotating key to reproduce a moving picture; when the rotating key is turned clockwise, reproducing the moving picture according to the turning speed in a predetermined direction corresponding to the clockwise turning; and when the rotating key is turned counterclockwise, reproducing the moving picture according to the turning speed in a predetermined direction corresponding to the counterclockwise turning.

In accordance with still another aspect of the present invention, an apparatus and method for using a rotating key on a mobile terminal with a built-in TV receiver is provided. The rotating key has a plurality of dome switches on one side which can detect a contact signal when pressed by a user and a plurality of contact surfaces on the other side which can detect the position of the rotating key in each direction of rotation. The apparatus and method comprising the steps of detecting the direction of rotation of the rotating key to select a channel in a television mode; and displaying video signals broadcasted on a channel selected according to the direction of rotation of the rotating key.

BRIEF DESCRIPTION OF THE DRAWINGS

The above and other objects, features and advantages of the present invention will be more apparent from the following detailed description taken in conjunction with the accompanying drawings, in which.

In the drawings, the same element, although depicted in different drawings, will be designated by the same reference numeral or character.

DETAILED DESCRIPTION OF THE PREFERRED EMBODIMENTS

Embodiments of the present invention will be described with reference to the accompanying drawings. Throughout the following description, Menus or functions selected according to the direction and speed of rotation of the rotating key are used as examples. However, it should be obvious to those skilled in the art that the present invention can be modified or practiced with other menus or functions without departing from the scope of the invention.

In the following description of the preferred embodiments of the invention, a mobile terminal equipped with a camera will be described. However, the present invention is equally applicable to all general mobile terminals having no built-in camera or equipped with a TV receiver.

Figure 1:
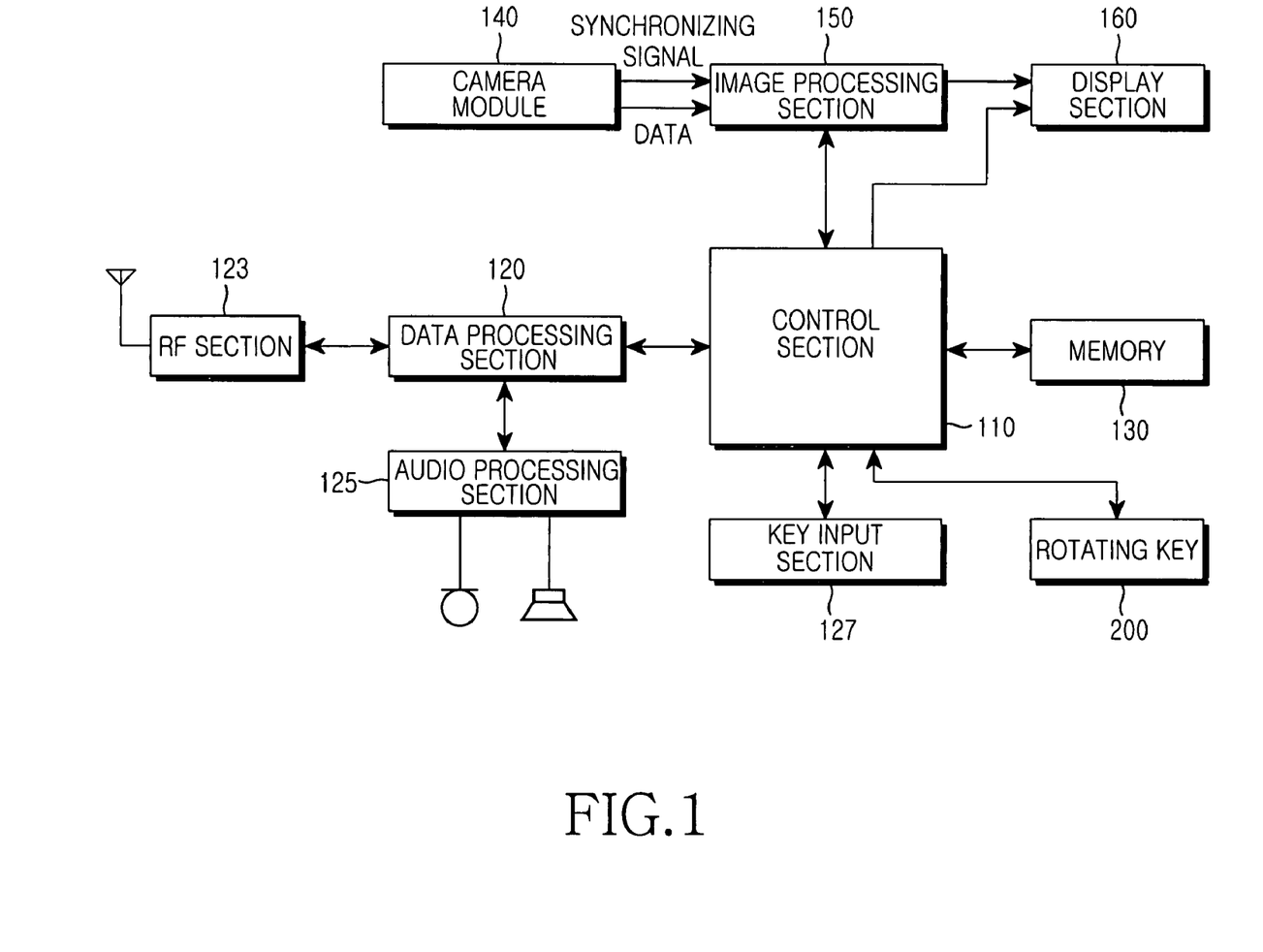
FIG. 1 is a block diagram illustrating a mobile terminal according to an embodiment of the present invention.

FIG. 1 is a block diagram illustrating a mobile terminal equipped with a camera according to an embodiment of the present invention.

Referring to FIG. 1, an RF section 123 performs a wireless communication function. The RF section 123 comprises a RF transmitter (not shown) for performing upward conversion and amplification of the frequency of a signal, which is being transmitted, and an RF receiver (not shown) for amplifying a signal, which is being received, with low noise and performing downward conversion of the frequency of the signal. A data processing section 120 comprises a transmitter (not shown) for coding and modulating a signal which is being transmitted and a receiver (not shown) for demodulating and decoding a signal which is being received. The data processing section 120 may comprise a modem and a codec. The codec comprises a data codec for processing packet data and an audio codec for processing an audio signal such as a speech signal. An audio processing section 125 reproduces an audio signal output from the audio codec of the data processing section 120 or transmits an audio signal generated from a microphone to the audio codec of the data processing section 120.

A memory 130 may comprise a program memory and a data memory. The program memory includes programs for controlling general operations of the mobile terminal and those for selecting functions or controlling image data according to the direction of rotation of the rotating key in the embodiments of the present invention. The data memory temporarily stores data generated during implementation of the above programs.

A control section 110 controls the overall operations of the mobile terminal. The control section 110 may include the data processing section 120. The control section 110 detects the direction of rotation of the rotating key 200 of the present invention and controls a cursor to move from one menu to another in a menu selection mode. Also, the control section 110 adjusts the focus on an object to be photographed according to a zoom function or a brightness control function selected in a camera mode. When reproducing a moving picture, the control section 110 detects the direction and speed of rotation of the rotating key 200 and controls a display section to display the moving picture according to the detected direction and speed of rotation.

A camera module 140 is used to take pictures of an object on which its lens focuses. The camera module 140 comprises a camera sensor for converting a photographed optical signal into an electric signal and a signal processor for converting an analog image signal photographed by the camera sensor into digital data. Assuming that the camera sensor is a charge coupled device (CCD) sensor, the signal processor can be a digital signal processor (DSP). The camera sensor and the signal processor can be either integrated into a single element or separated into independent elements.

An image processing section 150 generates picture data for displaying an image signal output from the camera module 140. The image processing section 150 processes image signals output from the camera module 140 in frames. Also, the image processing section 150 adjusts the frame image data to be compatible with the display section 160, and in particular to features of the display such as the size and resolution, and outputs the adjusted frame image data. The image processing section 150 comprises an image codec, and compresses the frame image data displayed on the display section 160 in a preset manner or restores the compressed frame image data to the original frame image data. The image codec is selected from a variety of still or moving picture codecs, such as Joint Picture Experts Group (JPEG) codec, Moving Picture Experts Group 4 (MPEG4) codec or Wavelet codec among others. The image processing section 150 has an on screen display (OSD) function. The image processing section 150 can output OSD data according to the displayed picture size via the control section 110.

The display section 160 displays image data output from the image processing section 150 or user data output from the control section 110. The display section 160 can be a Liquid Crystal Display (LCD) comprising an LCD controller, a memory for storing image data and an LCD device. When the LCD is a touch screen, it can serve as an input section. A key input section 127 is provided with keys for inputting numbers and characters and function keys for establishing various functions.

The rotating key 200 can be turned clockwise or counterclockwise, thereby enabling the user to rapidly select a menu or an operation mode function.

Figure 2A:
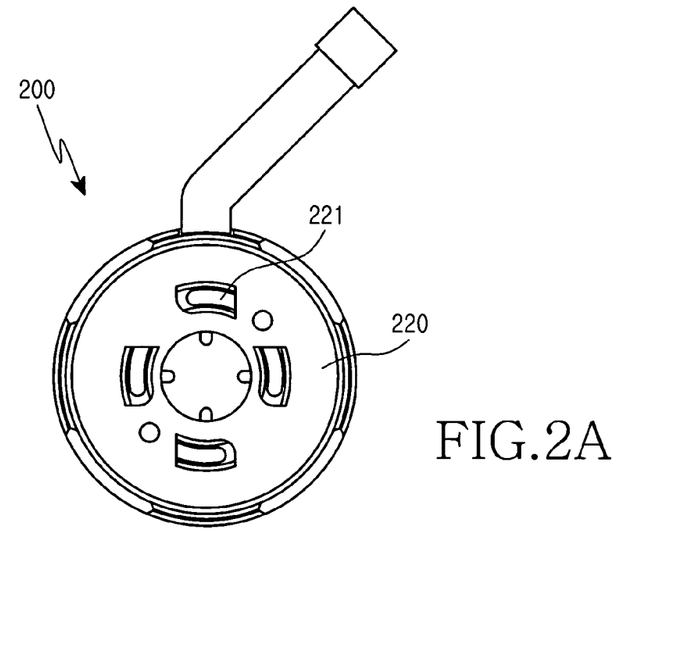
FIGS. 2A through 2E are block diagrams illustrating a structure of the rotating key illustrated in FIG. 1.
Figure 2B:
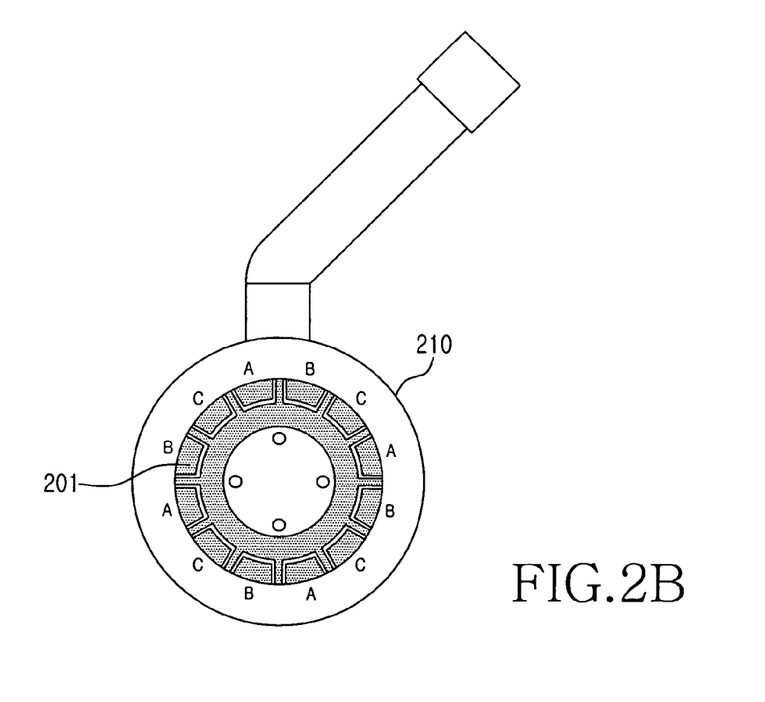
Figure 2C:
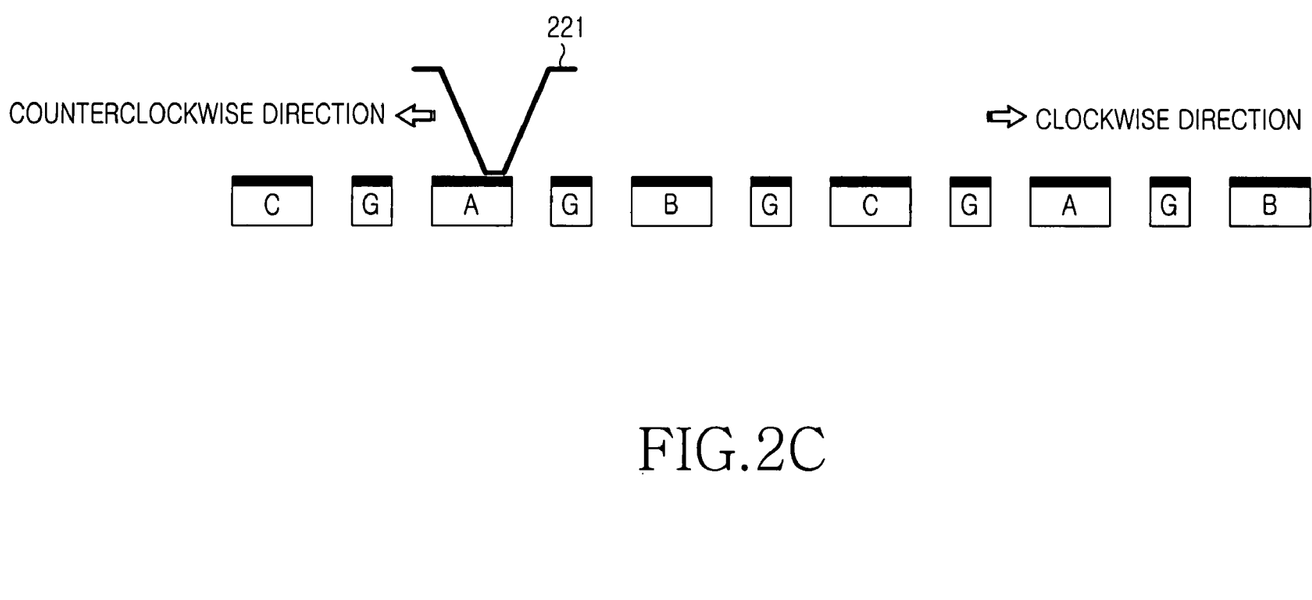
Figure 2D:
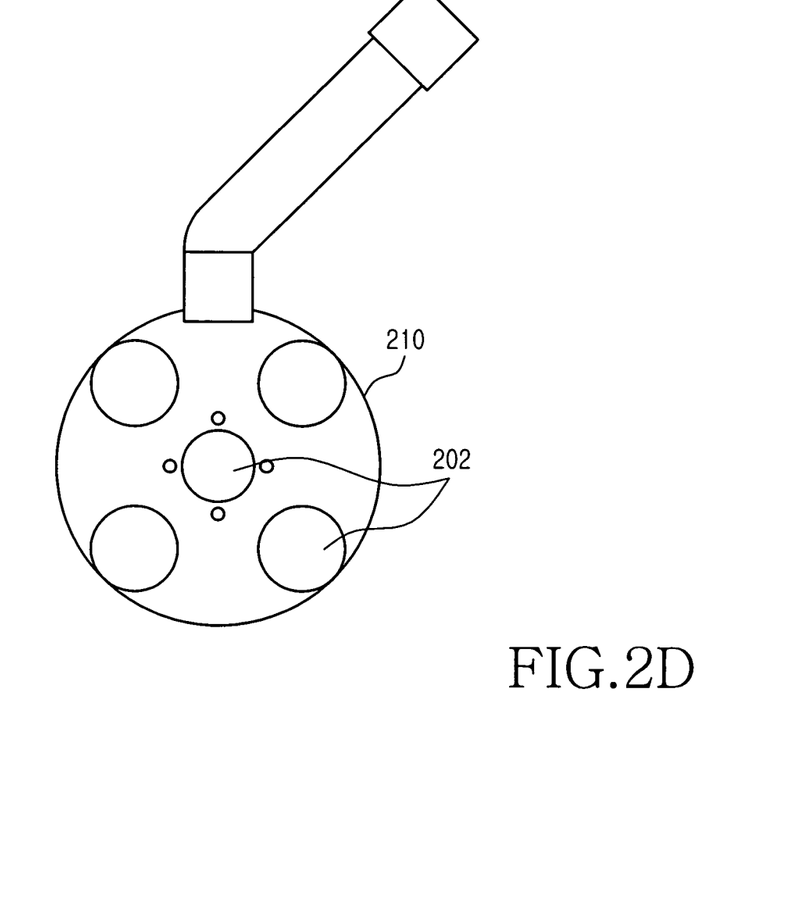
Figure 2E:
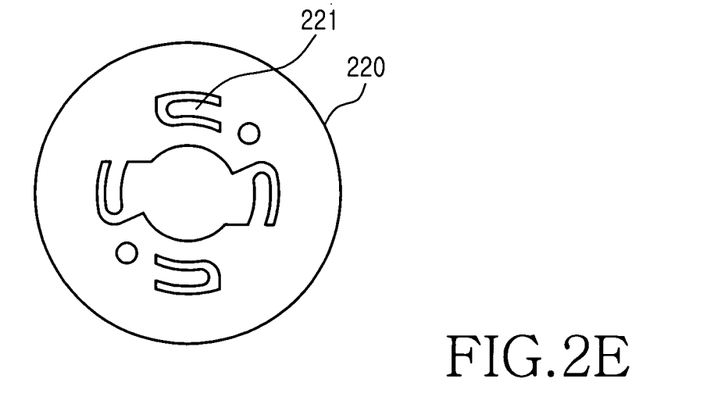

FIG. 2A shows the rotating key 200 as explained above. FIG. 2B is a plane view of a printed circuit board (PCB) of the rotating key, which has a plurality of contact surfaces. FIG. 2C is a cross-sectional structure of the PCB in FIG. 2B. FIG. 2D is a bottom view of the PCB having a plurality of dome switches. FIG. 2E shows a contact plate of the rotating key 200.

Referring to FIGS. 2A through 2E, the rotating key 200 includes a contact plate 220 having a contact terminal 221 and a PCB 210 for receiving an electrical signal upon contact with the contact terminal 221.

The PCB 210 comprises five dome switches on one side as shown in FIG. 2D to detect a contact signal when pressed by the user and a plurality of contact surfaces 201 on the other side as shown in FIG. 2B to enable the contact terminal 221 to detect the position of the rotating key in each direction of rotation.

Figure 3:
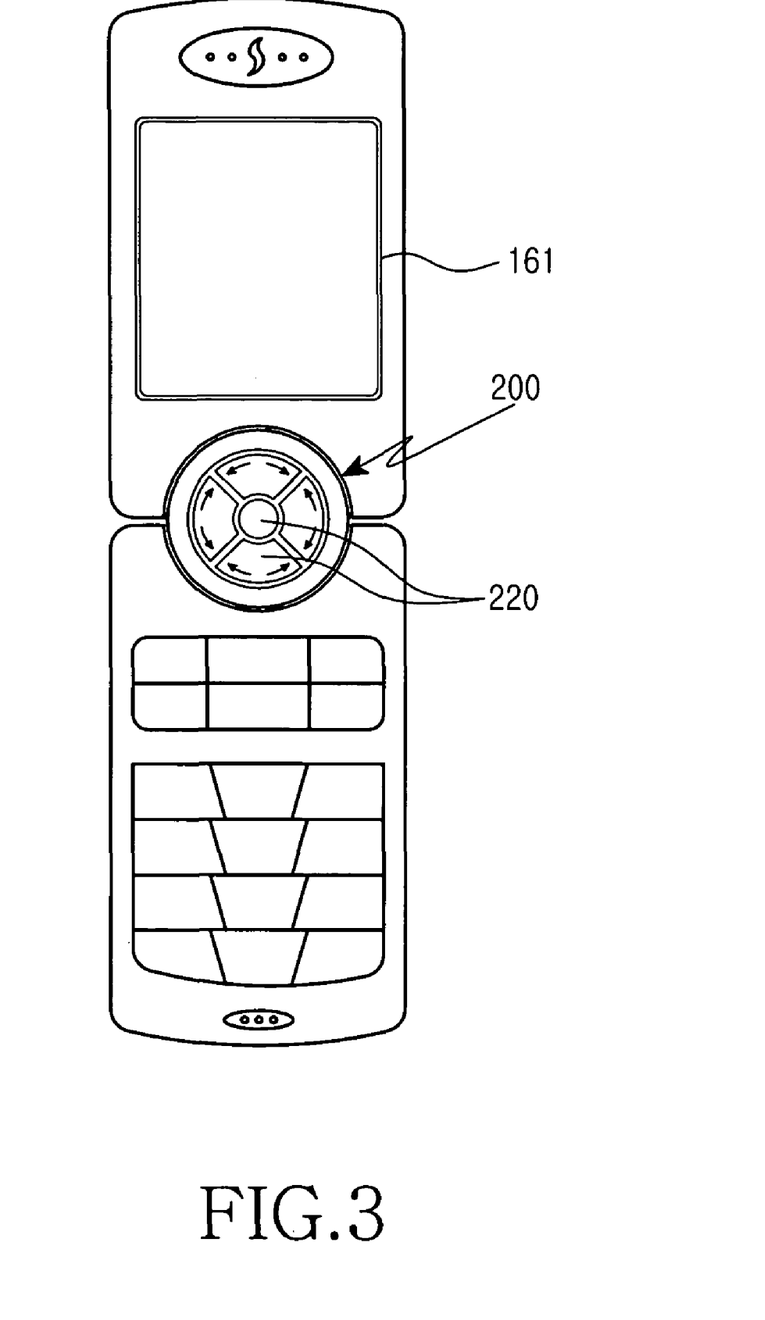
FIG. 3 is a schematic diagram illustrating a mobile terminal having the rotating key illustrated in FIG. 2.

Assuming that the plurality of contact surfaces 201 are arrayed in a repeated A-B-C sequence of positions in a clockwise manner as shown in FIGS. 2B and 2C, each port of the contact surfaces 201 will be in a "high" state if not connected to the contact terminal 221. Each port will become "low" immediately when connected to the contact terminal 221. In other words, when the user turns the rotating key 200 clockwise, the contact surfaces 201 become low in the sequence of A, B, C, A, B, C, and so on. When the user turns the rotating key 200 counterclockwise, the contact surfaces 201 become low in the sequence of A, C, B, A, C, B, and so on. Thus, it is possible to detect whether the rotating key 200 is turned clockwise or counterclockwise. Each port of the contact surfaces 201 alternates between a long-term high state and a short-term low state while the rotating key 200 is turned. It is possible to know the turning speed of the rotating key 200 by measuring the cycle of such alternation. FIG. 3 is a block diagram illustrating a mobile terminal provided with the rotating key apparatus.

Figure 4A:
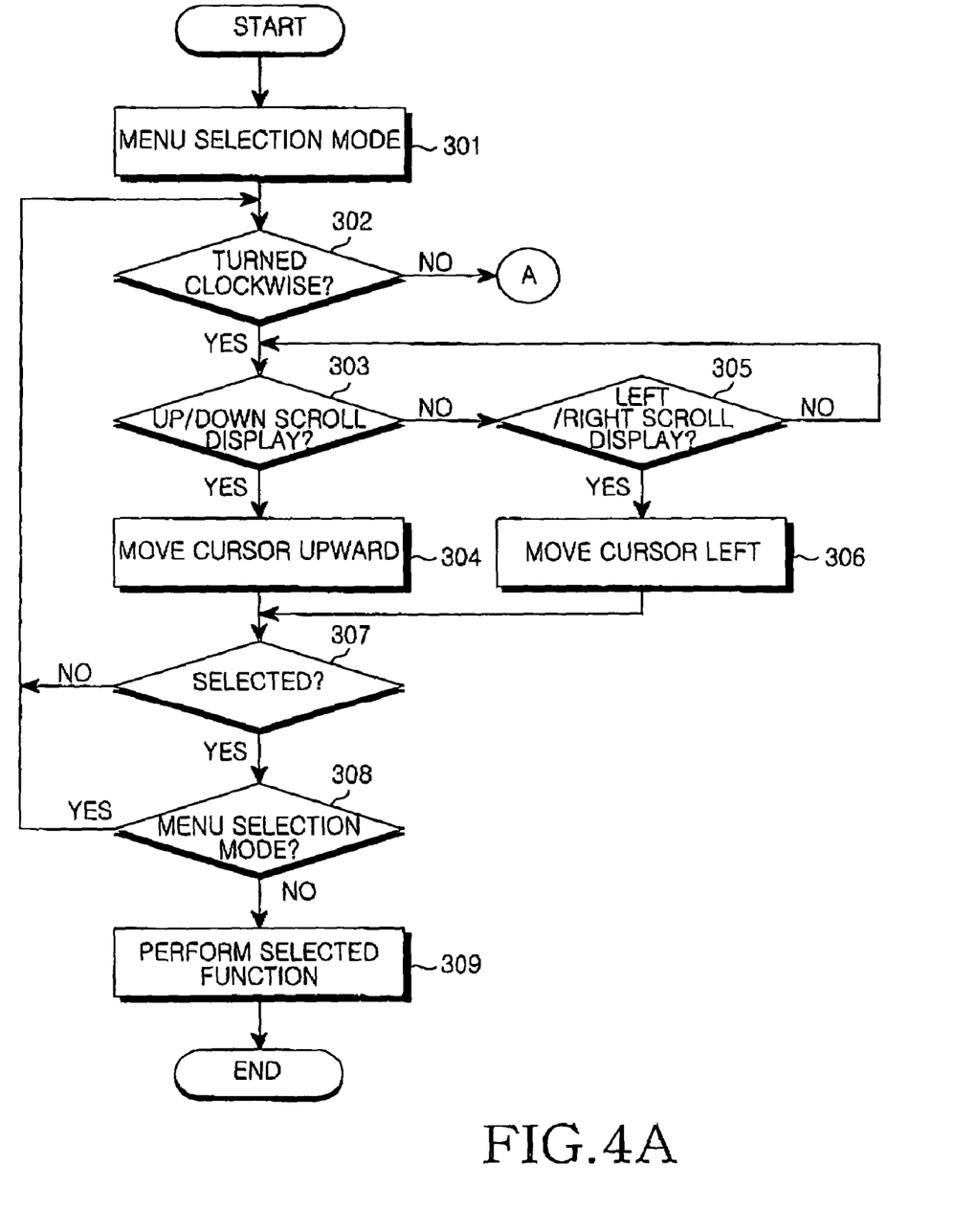
FIGS. 4A and 4B are flow charts illustrating a process of selecting a menu in a mobile terminal according to a first embodiment of the present invention.
Figure 4B:
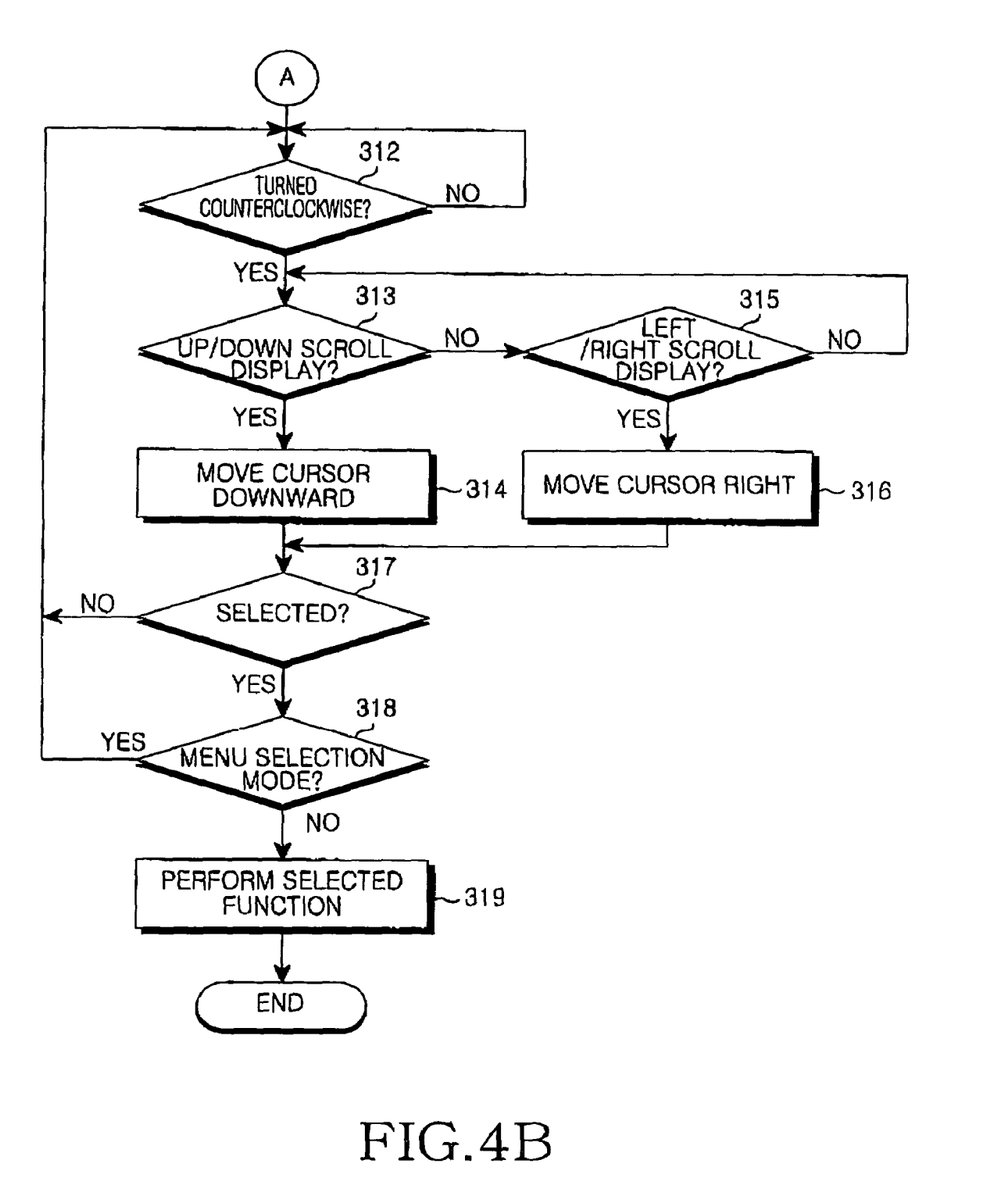

FIGS. 4A and 4B are flow charts illustrating a process of selecting a menu by turning the rotating key according to a first embodiment of the present invention. Although the above drawings show a process of selecting a menu according to the direction of rotation of the rotating key, it is possible to select a menu using the dome switches formed on the rotating key. In the first embodiment, a menu selection mode refers to a mode of displaying menus that can be selected by moving a cursor, such as an initial menu, a text message or a phone book. It is assumed that the cursor moves to upper menus in an up/down scroll display when the rotating key is turned clockwise and that the cursor moves to lower menus when the rotating key is turned counterclockwise. It is also assumed that the cursor moves to left menus in a left/right scroll display when the rotating key is turned clockwise and that the cursor moves to right menus when the rotating key is turned counterclockwise. However, as will be appreciated, it is readily possible to make the cursor move downward when the rotating key is turned clockwise and move upward when the rotating key is turned counterclockwise. Also, it is possible to make the cursor move right when the rotating key is turned clockwise and move left when the rotating key is turned counterclockwise.

Hereinafter, the process of selecting a menu according to the direction of rotation of the rotating key will be explained in more detail with reference to FIGS. 1 to 4.

When the user of the mobile terminal turns the rotating key 200, the control section 110 detects the direction of rotation of the rotating key 200 at step 301. If the rotating key 200 is turned clockwise, the control section 110 will detect the clockwise turning and will move the cursor according to the direction of rotation at step 302.

If the display section 160 is in the mode of the up/down scroll display, the control section 110 will detect this mode at step 303 and will move the cursor upward at step 304 to position the cursor on an upper menu. If the display section 160 is in the mode of the left/right scroll display, the control section 110 will detect this mode at step 305 and will move the cursor left at step 306 to position the cursor on a left menu. While moving the cursor at step 304 or 306, the user can press an OK key to select a menu on which the cursor is positioned. A dome switch 202 provided on the rotating key 200 can serve as the OK key. If the OK key is not pressed at step 307, the process returns to step 302. If the OK key is pressed at step 317, the control section 110 detects the key input and proceeds to step 308 to enter the menu selection mode. The process then proceeds to step 309 to perform a function corresponding to the selected menu. Specifically, when submenus of the menu selected at step 307 are displayed on the display section 160, the control section 110 detects the display of the sub-menus at step 308 and returns to step 302 to enable the user to select a sub-menu by turning the rotating key 200.

If the user turns the rotating key 200 counterclockwise at step 301, the control section 110 will detect the counterclockwise turning and will move the cursor according to the direction of rotation at step 312.

If the display section 160 is in the mode of the up/down scroll display, the control section 110 will detect this mode at step 313 and will move the cursor downward at step 314 to position the cursor on a lower menu. If the display section 160 is in the mode of the left/right scroll display, the control section 110 will detect this mode at step 315 and will move the cursor right at step 316 to position the cursor on a right menu. While moving the cursor at step 314 or 316, the user can press the OK key to select a menu on which the cursor is positioned. A dome switch 202 provided on the rotating key 200 can serve as the OK key. The control section 110 detects the key input at step 317 and proceeds to step 318 for the menu selection mode. If the menu selection mode is not selected, the process returns to step 312. If the menu selection mode is selected, the process proceeds to step 319 to perform a function corresponding to the selected menu. Specifically, when sub-menus of the menu selected at step 317 are displayed on the display section 160, the control section 110 detects the display of the sub-menus at step 318 and returns to steps 312 to enable the user to select a sub-menu by turning the rotating key 200.

Figure 5:
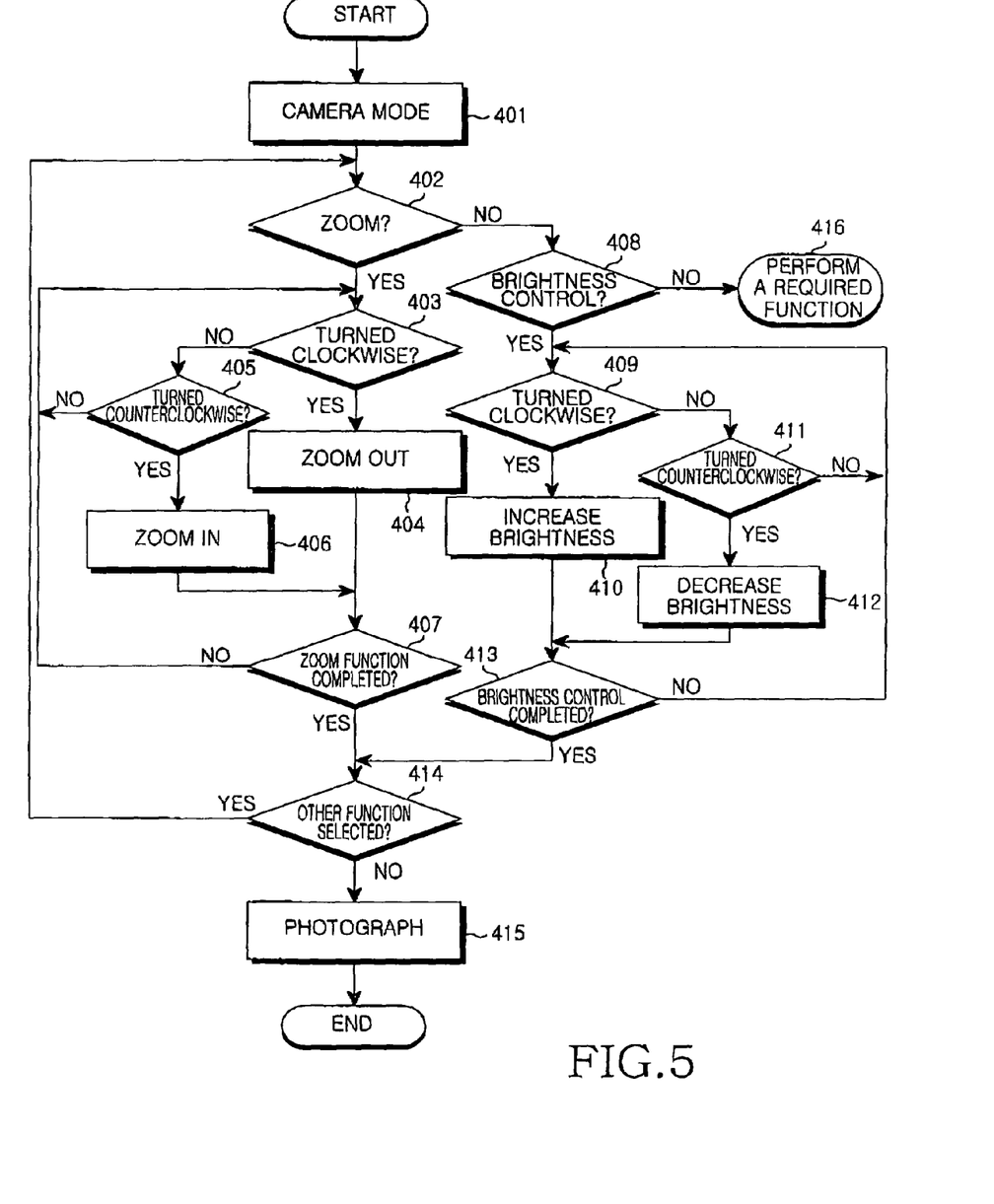
FIG. 5 is a flow chart illustrating a process of controlling an image signal in a mobile terminal according to a second embodiment of the present invention.

FIG. 5 is a flow chart illustrating a process of controlling an image signal by turning the rotating key according to the second embodiment of the present invention. Although this drawing shows a process of controlling an image signal in a camera mode by turning the rotating key, it is possible to control the image signal using the dome switches formed on the rotating key. In the second embodiment, the camera mode refers to a mode of obtaining an image signal through the camera module and displaying the image signal on the display section. Although the rotating key used to zoom in or out or control the brightness of a picture displayed in the camera mode will be explained as the second embodiment of the present invention, it is equally applicable in any other function mode that can be controlled according to the direction and speed of rotation.

It is assumed that a zoom-out function for gradually reducing the size of an image is performed in a zoom function mode when the rotating key is turned clockwise and that a zoom-in function for gradually enlarging the image is performed when the rotating key is turned counterclockwise.

It is also assumed that the brightness of the picture is gradually increased in a brightness control mode when the rotating key is turned clockwise and gradually decreased when the rotating key is turned counterclockwise. However, it should be understood that it is equally possible to configure the rotating key to zoom in when turned clockwise and zoom out when turned counterclockwise. Also, it is possible to configure the rotating key to gradually increase the brightness of the picture when turned clockwise and gradually decrease the brightness of the picture when turned counterclockwise. The adjustable range of brightness varies depending on the types of mobile terminals.

Hereinafter, the process of controlling an image signal using the rotating key according to a second embodiment of the present invention will be explained in more detail with reference to FIGS. 1 to 3.

When the user selects a zoom function for an image signal obtained through the camera module 140 and displayed on the display section 160 in the camera mode at step 401, the control section 110 detects the selection of the zoom function at step 402 and changes the current mode of the mobile terminal to the zoom mode. When the user turns the rotating key 200 clockwise, the control section 110 detects the clockwise turning at step 403 and proceeds to step 404 to gradually zoom out from the image according to the turning speed. When the user turns the rotating key 200 counterclockwise, the control section detects the counterclockwise turning at step 403 and proceeds to step 406 to gradually zoom in on the image according to the turning speed. At step 407, the control section 110 detects the completion of the zoom function performed at step 404 or 406 and determines whether the user selects any other function mode. If the user presses the camera key, the control section 110 will detect this input and will proceed to step 414 to determine whether any other function is selected. If the query at step 414 is answered negatively, the process proceeds to step 415 where the image is photographed. If the query at step 414 is answered affirmatively at step 414, the control section 110 will detect and perform the selected function and return to step 402.

If the user does not select the brightness control function, the control section 110 will detect this selection at step 408 and proceed to step 416 where other required functions are performed.

If the user selects the brightness control function, the control section 110 will detect this selection at step 408 and will change the current mode of the mobile terminal to the brightness control mode. When the user turns the rotating key 200 clockwise, the control section 110 detects the clockwise turning at step 409 and gradually increases the brightness of the picture according to the turning speed at step 410. When the user turns the rotating key 200 counterclockwise, the control sectional 10 detects the counterclockwise turning at step 411 and gradually decreases the brightness of the picture according to the turning speed at step 412. At step 413, the control section 110 detects the completion of the brightness control function performed at step 410 or 412 and determines whether the user selects any other function mode. If the user selects any other function, the control section 110 will detect the selection at step 414 and will performed the selected function. If the user presses the camera key, the control section will proceed to step 415 to photograph the image.

Figure 6:
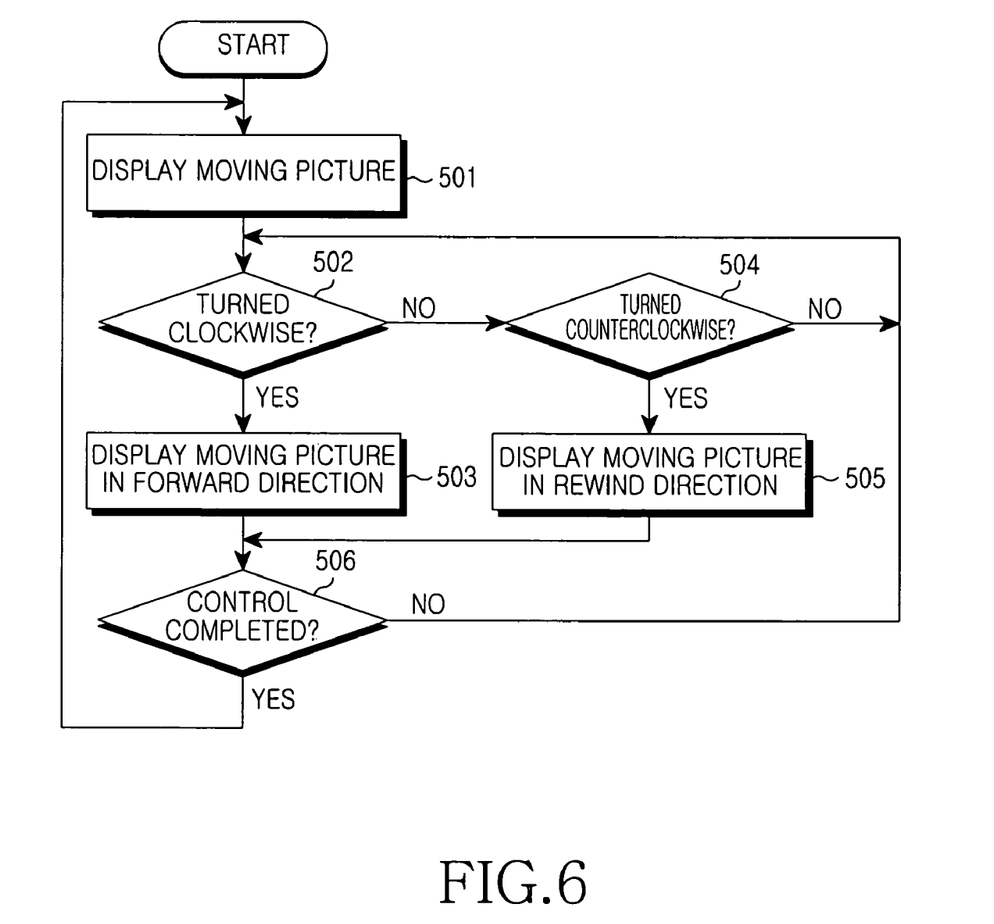
FIG. 6 is a flow chart illustrating a process of controlling a moving picture in a mobile terminal according to a third embodiment of the present invention.

FIG. 6 is a flow chart illustrating a process of controlling a moving picture by turning the rotating key according to a third embodiment of the present invention. Although this drawing shows a process of controlling a moving picture in the camera mode according to the direction of rotation of the rotating key, it is possible to control the moving picture using the dome switches formed on the rotating key. Although the rotating key used to control a moving picture will be explained as the third embodiment of the present invention, it is equally applicable to control a still picture.

In this embodiment, a moving picture is reproduced through the Internet or stored in the mobile terminal after being downloaded from the Internet or taken by a camcorder. It is assumed that a fast-forward function is performed when the rotating key is turned clockwise and that a rewind function is performed when the rotating key is turned counterclockwise. However, it is possible to configure the rotating key to perform the rewind function when turned clockwise and the fast-forward function when turned counterclockwise.

If the user turns the rotating key 200 clockwise at step 501 to display a moving picture, the control section 110 will detect the clockwise turning at step 502 and will perform the fast-forward function according to the turning speed at step 503. If the rotating key 200 is turned clockwise while the moving picture is being reproduced, the control section 110 will reproduce the moving picture in fast-forward motion.

If the user turns the rotating key 200 counterclockwise at step 501, the control section 110 will detect the counterclockwise turning at step 504 and will perform the rewind function according to the turning speed at step 505. If the rotating key 200 is turned counterclockwise while the moving picture is being reproduced, the control section 110 will reproduce the moving picture in rewind motion.

After step 503 or 505 is performed, a query is made as to whether the control is completed. If the query is answered affirmatively, the process returns to step 501. If the query is answered negatively, the process returns to step 502. The rotating key 200 as shown in FIG. 2 is also applicable to a mobile terminal equipped with a TV receiver. For example, the rotating key 200 can be used to select a channel when a TV broadcasting signal is received through the display section.

The rotating key provided on a mobile terminal according to embodiments of the present invention enable fast selection of a menu or an operation mode function available on the mobile terminal, thereby improving user convenience.

Although embodiments of the present invention have been described for illustrative purposes, those skilled in the art will appreciate that various modifications, additions and substitutions are possible, without departing from the scope and spirit of the invention as disclosed in the accompanying claims, including the full scope of equivalents thereof.

What is claimed is:

1. A rotating key for use with a mobile terminal, the method comprising the steps of:
   detecting if the rotating key, which has a plurality of dome switches located on one side of a printed circuit board (PCB) for detecting a contact signal when pressed and a plurality of contact surfaces on the other side of the PCB for detecting the position of the rotating key in each direction of rotation, is turned or a dome switch is pressed in a menu or function selection mode;
   when the rotating key is turned, selecting a menu according to the direction of rotation; and
   when a dome switch is pressed, selecting a menu or function according to the pressed dome switch, wherein the function allows a user to select a zoom, brightness level, direction of motion picture and selecting channel.

2. The method according to claim 1, wherein said step of turning the rotating key to select a menu or function comprises:
   when the rotating key is turned clockwise, moving a cursor to menus or functions in a predetermined direction; and
   when the rotating key is turned counterclockwise, moving the cursor to menus or functions in the opposite direction.

3. The method according to claim 2, wherein in an up/down scroll display mode, said cursor moves to upper menus or functions when the rotating key is turned clockwise and to lower menus or functions when the rotating key is turned counterclockwise.

4. The method according to claim 3, wherein said cursor moves to lower menus or functions when the rotating key is turned clockwise and to upper menus or functions when the rotating key is turned counterclockwise.

5. The method according to claim 2, wherein in a left/right scroll display mode, said cursor moves to left menus or functions when the rotating key is turned clockwise and to right menus or functions when the rotating key is turned counterclockwise.

6. The method according to claim 5, wherein said cursor moves to right menus or functions when the rotating key is turned clockwise and to left menus or functions when the rotating key is turned counterclockwise.

7. The method according to claim 1, wherein said step of pressing a dome switch to select a menu or function comprises:
   when a left or right dome switch is pressed, moving a cursor to left or right menus or functions; and
   when an upper or lower dome switch is pressed, moving the cursor to upper or lower menus or functions.

8. The method according to claim 1, wherein said dome switches are used as short-cut keys.

9. In a mobile terminal provided with a camera and a rotating key, which has a plurality of dome switches located on one side of a printed circuit board (PCB) for detecting a contact signal when pressed and a plurality of contact surfaces on the other side of the PCB for detecting the position of the rotating key in each direction of rotation, a method for using the rotating key comprising the steps of:
   when a zoom function is selected in a camera mode, zooming in or out according to the direction and speed of rotation of the rotating key; and
   when a brightness control function is selected in the camera mode, controlling the brightness of a picture according to the direction and speed of rotation of the rotating key.

10. The method according to claim 9, wherein said step of zooming in or out in the camera mode comprises:
when the rotating key is turned clockwise, zooming in or out according to the turning speed; and
when the rotating key is turned counterclockwise, zooming out or in according to the turning speed.

11. The method according to claim 9, wherein said step of controlling the brightness comprises:
when the rotating key is turned clockwise, increasing or decreasing the brightness of the picture according to the turning speed; and
when the rotating key is turned counterclockwise, decreasing or increasing the brightness of the picture according to the turning speed.

12. The method according to claim 9, wherein said dome switches are used to perform the zoom function or the brightness control function.

13. A rotating key method for use in a mobile terminal provided with a camera, the method for using the rotating key comprising the steps of:
detecting the direction and speed of rotation of the rotating key, which has a plurality of dome switches located on one side of a printed circuit board (PCB) for detecting a contact signal when pressed and a plurality of contact surfaces on the other side of the PCB for detecting the position of the rotating key in each direction of rotation, to reproduce a moving picture;
when the rotating key is turned clockwise, reproducing the moving picture according to the turning speed in a predetermined direction corresponding to the clockwise turning; and
when the rotating key is turned counterclockwise, reproducing the moving picture according to the turning speed in a predetermined direction corresponding to the counterclockwise turning.

14. A rotating key method for use in a mobile terminal provided with a TV receiver, the method for using the rotating key comprising the steps of:
detecting if, the rotating key, which has a plurality of dome switches located on one side of a printed circuit board (PCB) for detecting a contact signal when pressed and a plurality of contact surfaces on the other side of the PCB for detecting the position of the rotating key in each direction of rotation, is turned or a dome switch is pressed in a menu or function selection mode;
when the rotating key is turned, selecting a menu according to the direction of rotation; and
when a dome switch is pressed, selecting a menu or function according to the pressed dome switch, wherein the function allows a user to select a zoom, to adjust a brightness level, to reproduce a direction of a motion picture, and to select a channel in a television mode and display video signals broadcast on the channel selected according to the direction of rotation of the rotating key.

15. The method according to claim 14, wherein said dome switches are used to select a channel.

16. A mobile terminal for selecting a menu, the mobile terminal comprises:
a rotating key having a plurality of dome switches located on one side of a printed circuit board for detecting a contact signal when pressed and a plurality of contact surfaces on the other side of the PCB for detecting the position of the rotating key in each direction of rotation;
a display for displaying a menu; and
a controller for
detecting if the rotating key is turned or a dome switch is pressed in a menu selection mode;
selecting a menu according to the direction of rotation when the rotating key is turned; and
selecting a menu or function according to the pressed dome switch when the dome switch is pressed, wherein the function follows a user to select a zoom, brightness level, direction of motion picture and selecting channel.

17. The mobile terminal according to claim 16, wherein when the rotating key is turned clockwise, the controller moves a cursor to menus in a predetermined direction; and when the rotating key is turned counterclockwise, the controller moves the cursor to menus in the opposite direction.

18. The mobile terminal according to claim 17, wherein in an up/down scroll display mode, the cursor moves to upper menus when the rotating key is turned clockwise and to lower menus when the rotating key is turned counterclockwise.

19. The mobile terminal according to claim 18, wherein said cursor moves to lower menus when the rotating key is turned clockwise and to upper menus when the rotating key is turned counterclockwise.

20. The mobile terminal according to claim 17, wherein in a left/right scroll display mode, said cursor moves to left menus when the rotating key is turned clockwise and to right menus when the rotating key is turned counterclockwise.

21. The mobile terminal according to claim 20, wherein said cursor moves to right menus when the rotating key is turned clockwise and to left menus when the rotating key is turned counterclockwise.

22. The mobile terminal according to claim 16, wherein the controller moves a cursor to left or right menus when a left or right dome switch is pressed; and moves the cursor to upper or lower menus when an upper or lower dome switch is pressed.

23. The mobile terminal according to claim 16, wherein the dome switches are used as short-cut keys.

24. A mobile terminal for selecting a menu, the mobile terminal comprises:
a rotating key having a plurality of dome switches located on one side of a printed circuit board (PCB) for detecting a contact signal when pressed and a plurality of contact surfaces on the other side of the PCB for detecting the position of the rotating key in each direction of rotation;
a display for displaying a menu; and
a controller for performing the following operations
zooming in or out according to the direction and speed of rotation of the rotating key when a zoom function is selected in a camera mode; and
controlling the brightness of a picture according to the direction and speed of rotation of the rotating key when a brightness control function is selected in the camera mode.

25. The mobile terminal according to claim 24 wherein the controller zooms in or out according to the turning speed when the rotating key is turned clockwise; and zooms out or in according to the turning speed when the rotating key is turned counterclockwise.

26. The mobile terminal according to claim 24, wherein the controller increases or decreases the brightness of the picture according to the turning speed when the rotating key is turned clockwise; and decreases or increases the brightness of the picture according to the turning speed when the rotating key is turned counterclockwise.

27. The mobile terminal according to claim 24, wherein said dome switches are used to perform the zoom function or the brightness control function.

* * * * *